US011880424B1

(12) United States Patent
Shannon et al.

(10) Patent No.: US 11,880,424 B1
(45) Date of Patent: Jan. 23, 2024

(54) IMAGE GENERATION FROM HTML DATA USING INCREMENTAL CACHING

(71) Applicant: Intuit Inc., Mountain View, CA (US)

(72) Inventors: Jim Shannon, Mountain View, CA (US); Ivan Shevchenko, Lisbon (PT)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 18/103,480

(22) Filed: Jan. 30, 2023

(51) Int. Cl.
G06F 16/957 (2019.01)
G06F 16/958 (2019.01)

(52) U.S. Cl.
CPC ........ *G06F 16/9577* (2019.01); *G06F 16/986* (2019.01)

(58) Field of Classification Search
CPC .......................... G06F 16/9577; G06F 16/986
USPC ........................................................ 715/760
See application file for complete search history.

(56) References Cited

U.S. PATENT DOCUMENTS

2003/0023640 A1* 1/2003 Challenger ........... G06T 1/0021
715/255
2013/0073609 A1* 3/2013 Connolly .............. H04L 67/563
709/203
2016/0117061 A1* 4/2016 Hodgart ................. G09G 5/003
715/733
2016/0182672 A1* 6/2016 Kuperman .......... G06F 16/9574
709/213
2017/0070589 A1* 3/2017 Mineo ................. G06F 16/9574
2017/0359434 A1* 12/2017 Desjardins .......... G06F 16/9574

FOREIGN PATENT DOCUMENTS

WO WO-2022048141 A1 * 3/2022 ......... G06F 16/9574

* cited by examiner

*Primary Examiner* — Stephen S Hong
*Assistant Examiner* — Broderick C Anderson
(74) *Attorney, Agent, or Firm* — FERGUSON BRASWELL FRASER KUBASTA PC

(57) ABSTRACT

The one or more embodiments provide for a method. The method includes receiving a digital image stored in an object notation data format. The method also includes converting the digital image into hypertext markup language (HTML) data format. The method also includes caching the HTML data format to generate cached HTML data. The method also includes receiving a first request to reload the digital image. The method also includes rendering, responsive to receiving the first request to reload, the digital image using the cached HTML data to generate a rendered digital image.

18 Claims, 9 Drawing Sheets

```
······
{
    "type": "SPACER",
    "properties": {
        "height": 20,
        "backgroundColor": "transparent",
        "bottomSpacing": 0,
        "topSpacing": 0,
        "color": "transparent",
        "style": "solid"
    },
    "meta": {
        "uniqueId": "78eeb09d-f4ab-49a2-a40a-0b32f042d755",
        "parentId": "ea1d34aa-f5d0-4e4a-b74e-498e88670751"
    }
},
{
    "type": "IMAGE",
    "properties": {
        "isLogo": true,
        "src": "https:\/\/sawa-dev-2-storage-bucket.storage.googleapis.com\/profiles\/rdfrjlbiz7rwcu5e-191f6.png",
        "width": 244,
        "height": 91,
        "actualWidth": 616,
        "actualHeight": 152,
        "alignSelf": "center",
        "isFullBleed": "true",
        "isDefaultContent": "true",
        "backgroundColor": "#413a3a",
        "headingTextColor": "#ffffff",
        "linkTextColor": "#ffffff",
        "paragraphTextColor": "#ffffff",
        "textColor": "#ffffff"
    },
    "meta": {
        "uniqueId": "76297355-37db-44b7-853e-3bbf6371df92",
        "parentId": "ea1d34aa-f5d0-4e4a-b74e-498e88670751"
    },
    "key": 2
},
{
    "type": "SPACER",
    "properties": {
        "height": 20,
        "backgroundColor": "transparent",
        "bottomSpacing": 0,
        "topSpacing": 0,
        "color": "transparent",
        "style": "solid"
    },
    "meta": {
        "uniqueId": "5017643b-b8ba-443d-ac23-ebd78f3c3cb6",
        "parentId": "ea1d34aa-f5d0-4e4a-b74e-498e88670751"
    }
},
······
```

```
......
    img,
    a img {
      border: 0;
      height: auto;
      outline: none;
      text-decoration: none;
    }
    a[href^='tel'],
    a[href^='sms'] {
      color: inherit;
      cursor: default;
      text-decoration: none;
    }
    li p {
      margin: 0 !important;
    }
    .ProseMirror a {
      pointer-events: none;
    }
    @media only screen and (max-width: 480px) {
      body {
        width: 100% !important;
        min-width: 100% !important;
      }
      body.mobile-native {
        -webkit-user-select: none;
        user-select: none;
        transition: transform 0.2s ease-in;
        transform-origin: top center;
      }
      body.mobile-native.selection-allowed a,
      body.mobile-native.selection-allowed .ProseMirror {
        user-select: auto;
        -webkit-user-select: auto;
      }
      colgroup {
        display: none;
      }
      img {
        height: auto !important;
      }
      .mceWidthContainer {
        max-width: 660px !important;
      }
      .mceColumn {
        display: block !important;
        width: 100% !important;
      }
      .mceColumn-forceSpan {
        display: table-cell !important;
        width: auto !important;
      }
      .mceSpacing-24 {
        padding-right: 12px !important;
        padding-left: 12px !important;
      }
......
```

```
......
<img
  width="248"
  style="
      width: 248px;
      height: auto;
      max-width: 100%;
      display: block;
  "
  alt=""
  src="https://storage.googleapis.com/sawa-dev-2-storage-bucket/photobank/placeholder-logo-v2.png"
  role="presentation"
  class="imageDropZone"
/>
......
```
} 420

IMAGE GENERATION FROM HTML DATA USING INCREMENTAL CACHING

BACKGROUND

JavaScript Object Notation (JSON) is an open standard file format and data interchange format that uses human-readable text to store and transmit data objects of attribute-value pairs and arrays. JSON data objects, and other object notation data objects, may be used to store image data, among other types of data.

In some cases, it may be desirable to render images stored as JSON data objects on a web browser by rendering the JSON data objects using a hypertext markup language (HTML) format. HTML is a programming language used by web browsers and other computer programs to process, transmit, and/or display information. However, computationally, rendering JSON objects in an HTML format may be unacceptably slow in some cases.

SUMMARY

The one or more embodiments provide for a method. The method includes receiving a digital image stored in an object notation data format. The method also includes converting the digital image into hypertext markup language (HTML) data format. The method also includes caching the HTML data format to generate cached HTML data. The method also includes receiving a first request to reload the digital image. The method also includes rendering, responsive to receiving the first request to reload, the digital image using the cached HTML data to generate a rendered digital image.

The one or more embodiments provide for another method. The method includes providing digital images stored in an object notation data format. The method also includes receiving a user selection of a digital image in the digital images. The method also includes converting the digital image into hypertext markup language (HTML) data format. The method also includes caching the HTML data format to generate cached HTML data. The method also includes receiving a first request to reload the digital image. The method also includes rendering, responsive to receiving the first request to reload, the digital image using the cached HTML data to generate a rendered digital image.

The one or more embodiments also provide for a system. The system includes a processor and a network interface in communication with the processor. The system also includes a data repository in communication with the processor. The data repository stores a digital image and an object notation data image that stores the digital image in an object notation data format. The data repository also stores a hypertext markup language (HTML) digital image that stores the digital image in an HTML data format. The data repository also stores cached HTML data, a first request to reload the digital image, and a rendered digital image. The system also includes a server controller programmed, when executed by the processor, to receive the object notation data image. The server controller is also programmed, when executed by the processor, to convert the object notation data image into the HTML digital image. The server controller is also programmed, when executed by the processor, to cache the HTML digital image to generate the cached HTML data. The server controller is also programmed, when executed by the processor, to receive the first request to reload the digital image. The server controller is also programmed, when executed by the processor, to render, responsive to receiving the first request, the digital image using the cached HTML data to generate the rendered digital image.

Other aspects of the one or more embodiments will be apparent from the following description and the appended claims.

BRIEF DESCRIPTION OF DRAWINGS

FIG. 4A, FIG. 4B, FIG. 4C, FIG. 4D, FIG. 4E, FIG. 4F, and FIG. 4G show screenshots of an example of the one or more embodiments.

Like elements in the various figures are denoted by like reference numerals for consistency.

DETAILED DESCRIPTION

Figure 1:
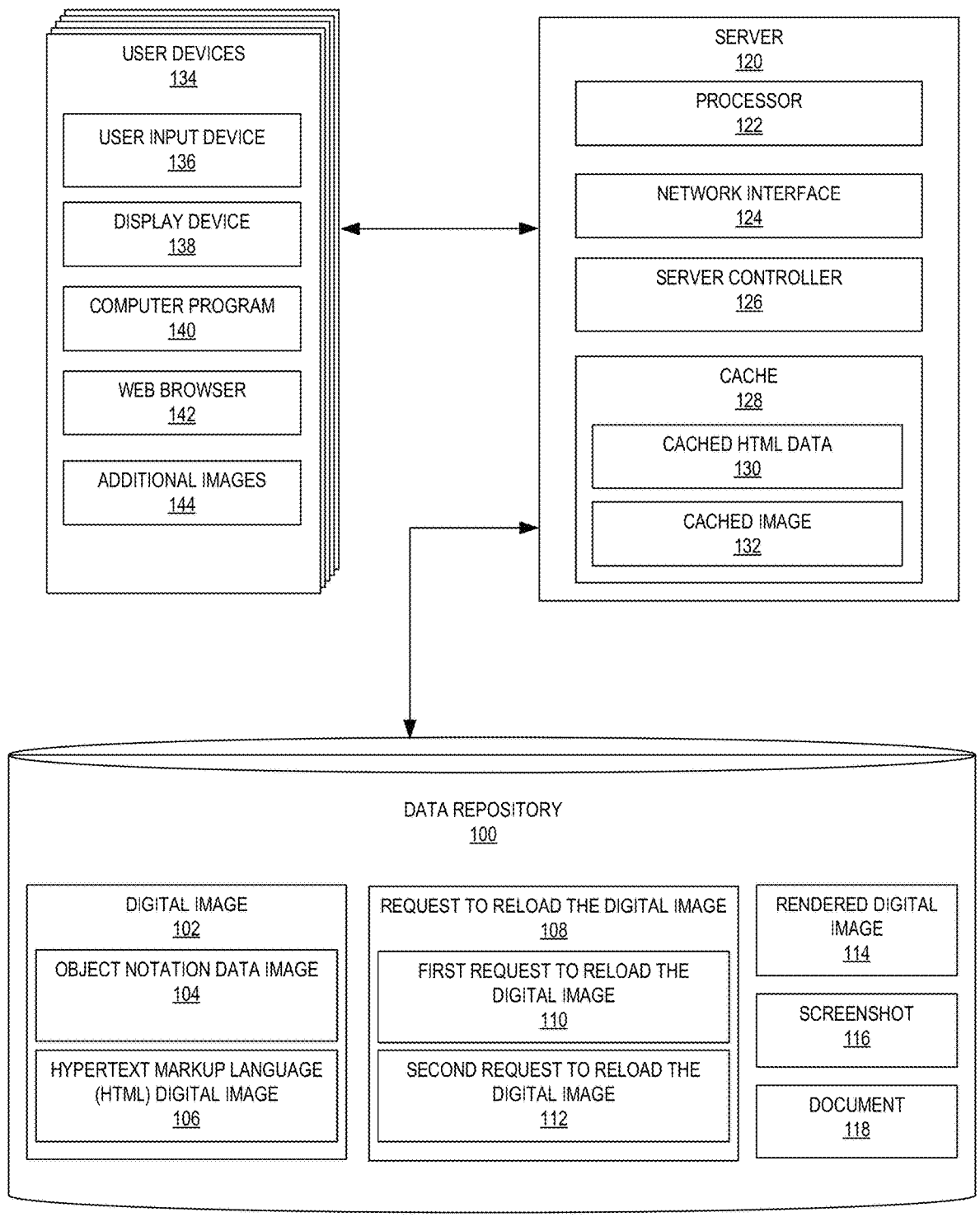
FIG. 1 shows a computing system, in accordance with one or more embodiments.

In general, one or more embodiments relate to image generation from a hypertext markup language (HTML) data using incremental caching. As indicated above, computationally, rendering image files stored as object notation objects may have unacceptably high latency in some cases. The relative computing resource expense of performing such rendering is compounded when multiple images are to be rendered. The relative expense is compounded again when the multiple images, or updates to the images, are repeatedly rendered. For applications where updates to hundreds of images are repeatedly rendered, users may become frustrated with the perceived slowness of the repeated rendering process, and the resulting apparent lack of responsiveness. Frustrated users may decide to abandon use of a software program programmed to perform such rendering. Likewise, the inefficient use of computing resources may cause other computing processes to be unresponsive. Thus, it is desirable to reduce the computational expense of repeatedly rendering images stored as object notation objects.

The one or more embodiments address the technical problem described above by transforming raw object notation data into HTML templates using an incremental caching process. While the initial process of transformation may have the same computational cost of performing the original transformation, by using an incremental caching process, each time the image or images are updated, the existing images are cached.

The incremental process includes two or three increments. The first increment may be relatively slow, as the images are rendered from the object notation files. However, after the second and third increments, the process of returning images becomes successively less computationally expensive. Hence, images may be returned more quickly, relative to the original rendering process.

The incremental process is described in detail below. Briefly, in the first increment, the object notation data objects are rendered in an HTML format (i. e., the original rendering process), which may be a relatively computationally expensive process. In the second increment, the image data in HTML format generated at the first increment is stored in a cache. The size of the cache and the amount of data stored in the cache is defined so as to enable quick retrieval. As such, caching is a process of storing data in a memory for quick retrieval. Thus, at the end of the second increment, the image is in HTML format.

A third increment is optional. The third increment further increases the speed of retrieving images. In the third increment, the images stored in HTML format are rendered, and then a screenshot of the rendered images is captured. A screenshot is a picture of the state of a display device at a moment in time. The screenshot is cached. Then, when the set of images is updated again, the screenshot may be recalled more quickly than rendering images stored in the HTML format.

The two or three-increment process may be performed repeatedly over time as new or modified images are added to a set of images. The two or three-increment process may be performed as background computer processes, so that while a user is considering a set of images the two or three-increment process is continually performed. As a result, the images may be presented and updated more quickly than repeatedly rendering object notation data objects, and the overall user experience improves.

Attention is now turned to the figures. FIG. 1 shows a computing system, in accordance with one or more embodiments.

The system shown in FIG. 1 includes a data repository (100). The data repository (100) may be a type of storage unit and/or device (e.g., a file system, database, data structure, or any other storage mechanism) for storing data. Further, the data repository (100) may include multiple different, potentially heterogeneous, storage units and/or devices.

The data repository (100) stores a digital image (102). The digital image (102) is data, stored in a machine readable format, which a computer may use to display an image on a display device.

The digital image (102) may be stored in one or more different formats. For example, the digital image (102) may take the form of an object notation data image (104). The object notation data image (104) is data, stored in a machine readable format and specifically in an object notation data format, which a computer may use to display the digital image (102). An example of an object notation data format is JavaScript Object Notation (JSON).

In another example, the digital image (102) may take the form of a hypertext markup language (HTML) digital image (106). The HTML digital image (106) is data, stored in a machine readable format and specifically in an HTML data format, which a computer may use to display the digital image (102).

The data repository (100) also stores a request to reload the digital image (108). The request to reload the digital image (108) may be characterized as a command to reload or re-display the digital image (102), because the request to reload the digital image (108) is received after the initial conversion of the object notation data image (104) into the HTML digital image (106). In other words, the initial conversion of the object notation data image (104) into the HTML digital image (106) may be considered an initial request to load the digital image (102). Accordingly, the initial request to load the digital image (102) may be considered a first increment in an embodiment. The request to reload the digital image (108) initiates a second increment in an embodiment, as described further with respect to FIG. 2.

The request to reload the digital image (108) may be a computer-readable command to reload the digital image (102). The command may be received via a computer network from a remote computing device (e.g., from a web browser executing on a remote computer), such as the user devices described below. The command could also be received from a server, described below, or received from some other computing device.

Because the one or more embodiments contemplate an incremental caching method, the one or more embodiments contemplate that two or more request to reload the digital image (102) may be received. Thus, the request to reload the digital image (108) includes at least a first request to reload the digital image (110). However, the request to reload the digital image (108) also may include a second request to reload the digital image (112). The second request to reload the digital image (112), may be received after the first request to reload the digital image (110) is received and executed. More requests to reload the digital image may be received and executed, as explained further in the method described with respect to FIG. 2. In an embodiment, the second request to load the digital image (112) may initiate a third increment of the one or more embodiments, as described with respect to FIG. 2.

The data repository (100) also may store a rendered digital image (114). Briefly, the rendered digital image (114) is the digital image (102) that a display device displays after a processor executes the first request to reload the digital image (110). More specifically, the rendered digital image (114) is the digital image (102) when the processor renders cached HTML data stored in a cache. The cache and the cached HTML data are described below. The process of rendering is described with respect to FIG. 2.

The data repository (100) also may store a screenshot (116). The screenshot (116) is a picture of the state of a display device at a moment in time. For example, a user may actuate a "print screen" button on a keyboard. In response, the processor may cause a picture of what is displayed on the display screen to be stored in a clipboard memory of the computer. However, in the one or more embodiments, the screenshot may be taken automatically without user input. The screenshot (116) may be stored as an image file that is relatively small in size (compared images stored in JSON or HTML data formats), such as but not limited to a portable graphics network (.png) file or joint photographic experts group (.jpeg) format.

The data repository (100) also may store a document (118). The document (118) is computer-generated, human-readable text and images. The document (118) may be generated in response to a selection of the rendered digital image (114), or in response to any other image generated in response to a subsequent request to reload the digital image (102). The document may take a variety of forms, such as but not limited to a presentation, a word processing document, an email, etc. Multiple examples of the document (118) are shown in FIG. 4F.

The system shown in FIG. 1 also may include a server (120). The server (120) is one or more computers, possibly operating a distributed computing environment. An example of the server (120) may be the computing system shown in FIG. 5A.

Figure 5A:
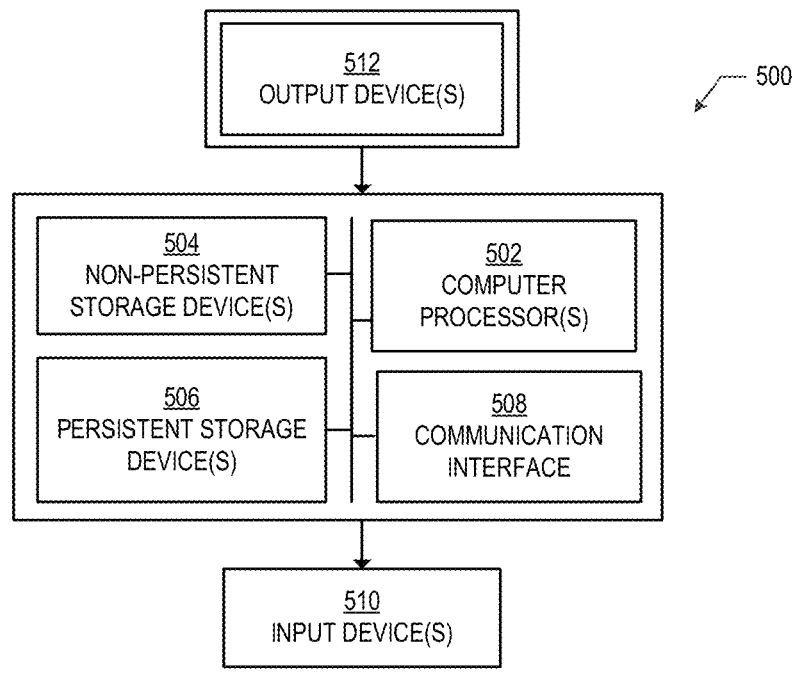
FIG. 5A and FIG. 5B show a computing system and network environment, in accordance with one or more embodiments.

The server (120) may include a processor (122). The processor (122) is one or more hardware processors, virtual processors, or may be an application specific integrated circuit. The processor (122) may execute as a single processor, or may be multiple processors possibly arranged in a distributed computing environment. The processor (122) may be programmed to execute one or more computer programs or software applications, such as the server controller (126) described further below. An example of the processor (122) is shown in FIG. 5A.

The server (120) also may include a network interface (124). The network interface (124) is hardware and/or software that permits one or more components of the server (120) to communicate with other computers, possibly over a network such as the Internet. An example of the network interface (124) is the communication interface (508) shown in FIG. 5A. An example of a network is the network (520) shown in FIG. 5B.

The server (120) also includes the server controller (126). The server controller is computer executable code, or an application specific integrated circuit, which, when executed, implements the methods described herein. Thus, for example, the server controller (126) may be executed to implement the method of FIG. 2 or FIG. 3, or the example of FIG. 4A through FIG. 4G.

The server (120) also may include a cache (128). The cache (128) is a hardware or software component that stores data so that future requests may be stored more quickly. For example, the cache (128) may be a non-transitory computer readable storage medium, such as memory or other storage defined above. As another example, the cache (128) may be defined by software instructions.

The cache (128) may be a hardware cache. A hardware cache is a form of computer memory which the processor (122) may access more quickly, relative to the speed at which the processor (122) may access information in the data repository (100). For example, the cache (128) may be a memory circuit of a size smaller than that provided by the data repository (100), and thus information in the cache (128) may be accessed more quickly. The cache (128) also may be a form of temporary memory which the processor (122) may access more quickly.

The cache (128) may store cached data. Cached data is data stored in the cache (128), as opposed to data stored in the data repository (100). However, cached data may be stored concurrently in the cache (128) and in the data repository (100).

For example, the cache (128) may store cached HTML data (130). The cached HTML data (130) is hypertext markup language data stored in the cache (128). The cached HTML data (130) may be, for example, one or more instances of the HTML digital image (106). Thus, when the processor (122) is called to process the first request to reload the digital image (110), the processor (122) may access the cache (128) to retrieve the cached HTML data (130) that defines the HTML digital image (106).

While the cache (128) is shown as being part of the server (120), one or more of the user devices (134) also may include a local cache, similar in nature and function to the cache (128). Thus, for example, the one or more embodiments contemplate that when one of the user devices (134) is commanded to reload a digital image on the corresponding display device (138), the cache that is accessed is located on the user devices (134). As a result, in some cases, it may be possible to avoid transmitting reloaded images from the cache (128) of the server (120) to one of the user devices (134).

The system shown in FIG. 1 also may include one or more user devices (134). The user devices (134) are computing systems that are distinct from, and possibly remote from, the server (120). The user devices (134) may be operated by one or more remote users, and may host one or more third party websites.

The user devices (134) include at least one user input device (136). The user input device (136) may be a keyboard, a mouse, a touchscreen, a microphone, etc. A user may use the user input device (136) to provide a user selection of the digital image (102), the rendered digital image (114), or the document (118), or may be used to issue a command that is transmitted to the server (120).

The user devices (134) also include a display device (138). The display device (138) is a display screen, a speaker, or some other device for communicating human-understandable information to a user.

The user devices (134) also include a computer program (140). The computer program (140) is computer executable code programmed to perform a function on one or more of the user devices (134). Examples of the computer program (140) include but are not limited to word processing software, presentation generation software, email programs or clients, etc. The computer program (140) may execute automatically in response to a command from the server (120) in some cases. For example, after a user selects, via the user input device (136), a digital image (102) displayed on the display device (138), the server (120) may command the computer program (140) to generate an email that contains the digital image (102)

The user devices (134) also include a web browser (142). The web browser (142) is software executable on the user devices (134) and, in an embodiment, may be an example of the computer program (140). The web browser (142) may be used to interact with the server (120) over a network.

The user devices (134) also include one or more additional images (144). The additional images (144) are images that, at least initially, are stored on one or more of the user devices (134). The additional images (144), at least initially, may not be stored in the data repository (100) or in the cache (128). In an embodiment, as explained below with respect to FIG. 2, the server (120) may screen scrape (or otherwise access) the additional images (144), and then add the additional images (144) to the images that are processed according to the one or more embodiments. In this manner, the total number of images available for display, according to the incremental caching method described herein, may be increased.

While FIG. 1 shows a configuration of components, other configurations may be used without departing from the scope of the one or more embodiments. For example, various components may be combined to create a single component. As another example, the functionality performed by a single component may be performed by two or more components.

Figure 2:
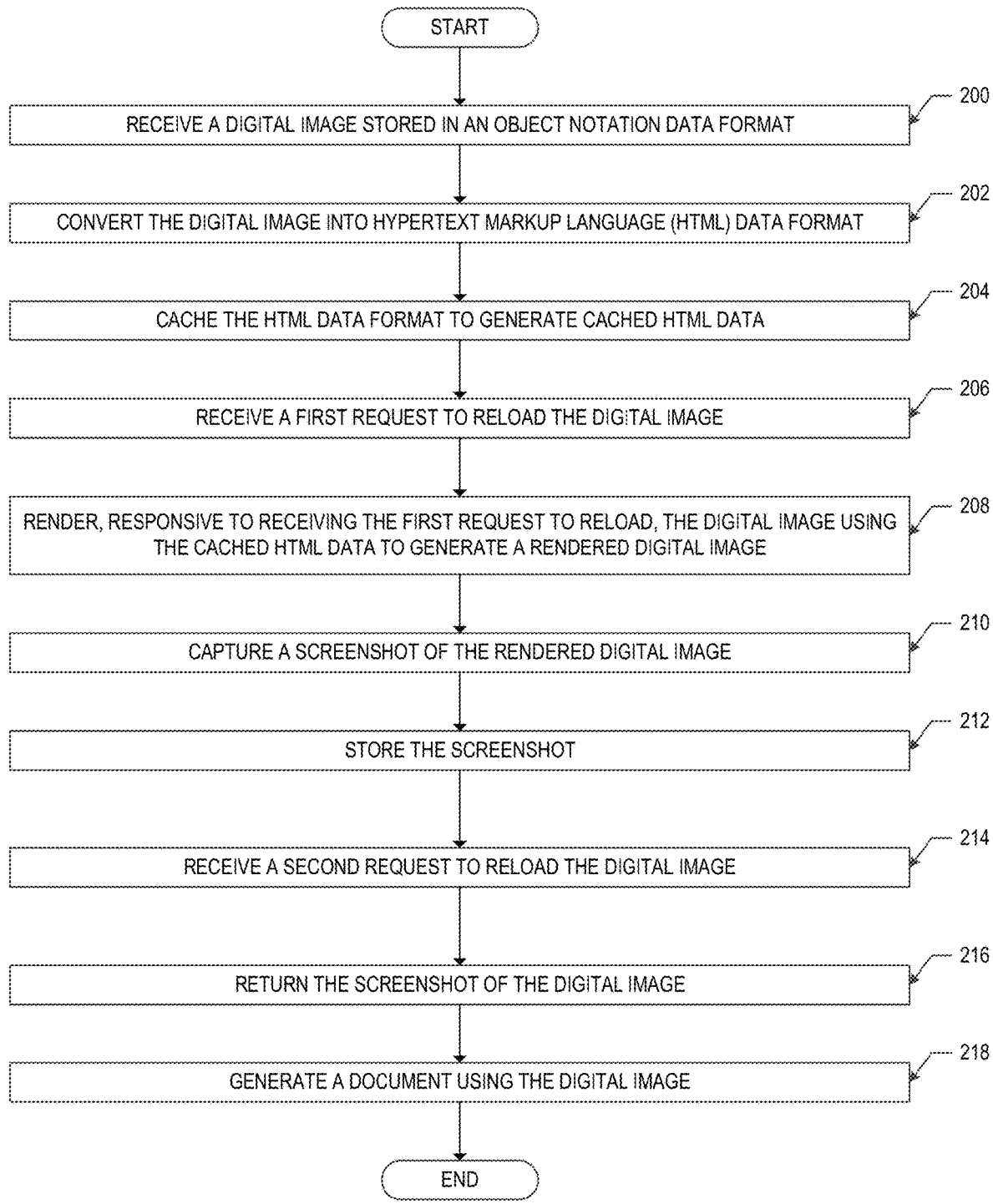
FIG. 2 and FIG. 3 show methods of the one or more embodiments, in accordance with one or more embodiments.
Figure 3:
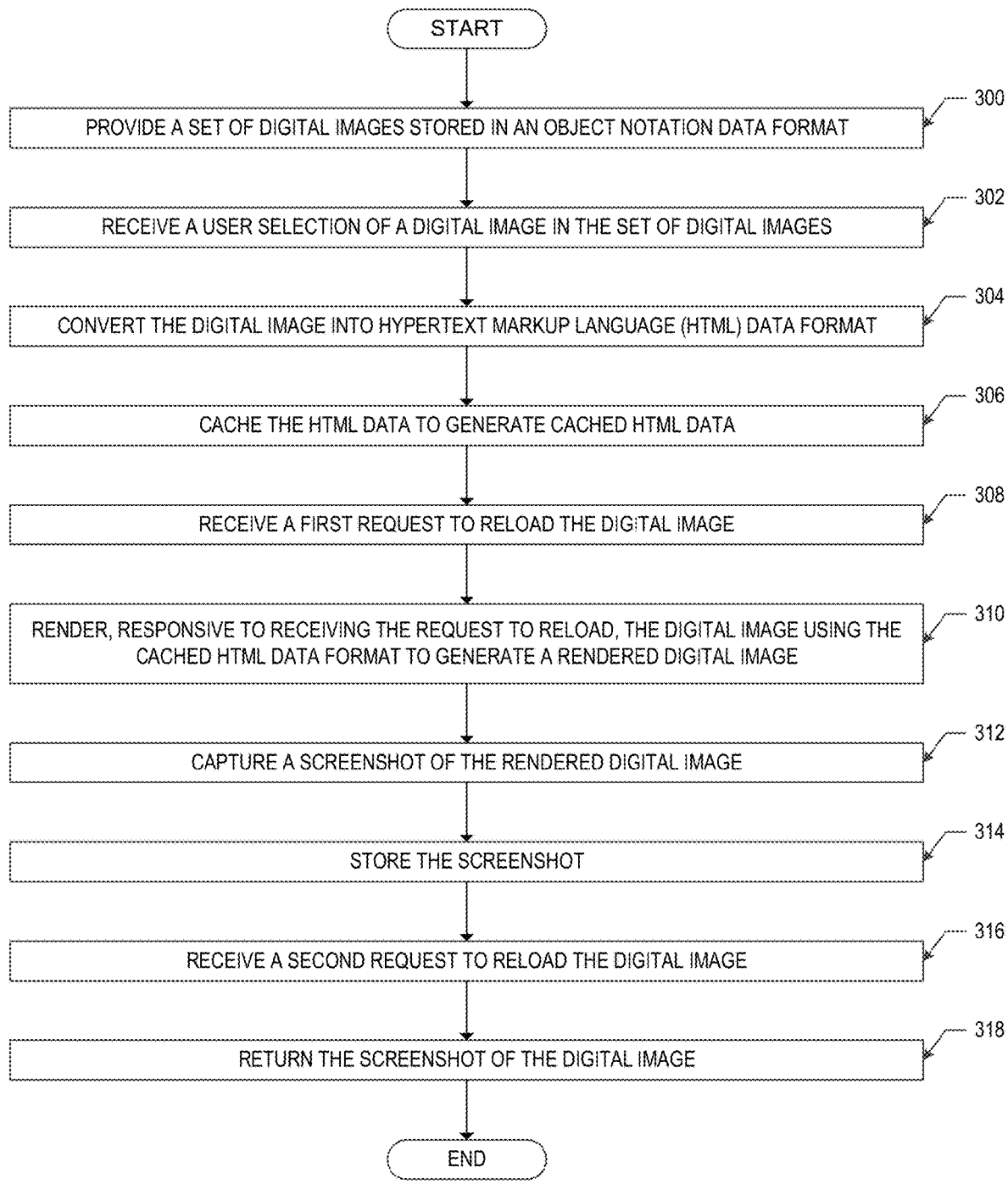

FIG. 2 and FIG. 3 illustrate methods of image generation from HTML data using incremental caching, in accordance with one or more embodiments. The methods of FIG. 2 and FIG. 3 may be implemented using the system of FIG. 1, possibly in conjunction with the computing system of FIG. 5A and the network environment of FIG. 5B. The method of FIG. 2 and FIG. 3 refer to the term "steps," in order to distinguish from the term "increment." The one or more embodiments use a two or three increment process. However, each increment in the one or more embodiments may include one or more of the steps in FIG. 2 or FIG. 3.

Step 200 includes receiving a digital image stored in an object notation data format. The digital image may be received from a data source that stores images in a JSON data format. The digital image may be created by a specific software program, such as but not limited to the Nuni Editor, or originate from one or more pre-created templates in the JSON data format.

Step 200 may be considered, in one embodiment, a first increment in a three-increment incremental caching process.

During the first increment, the image in the object notation data format may be rendered and displayed. While the initial process may be considered slower than rendering an image from HTML data, in one embodiment it may be advantageous to initially render the image directly from the object notation data format.

Step 202 includes converting the digital image into hypertext markup language (HTML) data format. The process of converting the digital image in the JSON data format to the digital image in the HTML data format may be accomplished by using a conversion algorithm.

In an example, the Nuni Renderer is capable of taking properly formatted Nuni Document JSON files and rendering the files into HTML format. The Nuni Renderer is specifically designed to read and understand the Nuni JSON format and convert the file to HTML. However, other renderers exist that are capable of converting digital images in the JSON data format to the HTML data format.

Secondly, the resulting HTML can be fully rendered into a view by a "headless" Chromium instance to be screenshotted into a PNG image Step 204 includes caching the HTML data format to generate cached HTML data. The cached HTML data may be stored in the cache of a processor, or in some other memory which the processor may access quickly, relative to the speed at which the processor could retrieve data from another data repository.

Step 206 includes receiving a first request to reload the digital image. The request may be received from a user device, possibly at the request of a user operating a user input device. The request also may be received from an automatic process executing on the user device. For example, a web browser displaying a set of images my transmit a request to the server. The request is a command to the server to re-transmit the images, or to modify the images currently displayed on the web browser.

The request also may be received by a process executing on the server. For example, an image may be added to or removed from a list of images, or an image in a list of images may be modified. The modified list of images may trigger the digital image, or the list of digital images, to be reloaded.

Step 208 includes rendering, responsive to receiving the first request to reload, the digital image using the cached HTML data to generate a rendered digital image. Rendering may be performed using a software algorithm that renders HTML data into an image. For example, an image stored in an HTML data format can be fully rendered into a view by a "headless" Chromium instance.

Step 202, step 204, step 206, and step 208, in one embodiment, may be considered a second increment in a three-increment incremental caching process. In particular, the image in the object notation data format is converted into an HTML data format, cached, and then rendered in response to receiving a request to reload the image.

In an embodiment, the method of FIG. 1 may terminate at step 208. In other words, the method may terminate after performing the first increment and the second increment described above. However, the speed of displaying the image, after receiving subsequent requests to reload the image, may be further increased by continuing the method of FIG. 2.

Thus, Step 210 may also include capturing a screenshot of the rendered digital image. The screenshot may be captured by the processor executing computer code for capturing a screenshot. The screenshot may be captured by a service, executing on a server. As a specific example, the screenshot may be captured by a service implementing running copies of the Chromium Headless Browser. This browser may render the image in the HTML data format, and then perform a snapshot to capture an image stored in a .png image data format.

Step 212 includes storing the screenshot. The screenshot may be stored in the cache. However, the screenshot also may be stored in the data repository.

Step 214 includes receiving a second request to reload the digital image. The second request is received after rendering at step 208 and after storing the screenshot at step 212. The second request may be received in a manner similar to how the first request to reload is received, as described with respect to step 206.

Step 216 includes returning the screenshot of the digital image. In other words, rather than rendering the digital image from an object notation data format or an HTML data format, the digital image is rendered from a picture data format (e.g., a ".png" file or a ".jpeg" file.) The process of returning the screenshot is faster than rendering the digital image using the cached HTML data.

The screenshot need not be the initial screenshot captured at step 212. For example, the screenshot captured at step 212 may be further sub-divided into individual pictures shown on the screenshot. Then, when an arrangement of pictures is modified, those pictures that were not modified are displayed using individual picture data format files, one per picture that was not modified. Thus, when the arrangement of pictures is changed, modified or added pictures may be rendered from either the object notation data format or the HTML data format, but the pictures that did not change may be rendered from the picture data format files.

Step 210, step 212, step 214, and step 216, in one embodiment, may be considered a third increment in a three-increment incremental caching process. In particular, a screenshot is taken of the image in the HTML data format, the screenshot is cached, and then the screenshot is rendered in response to receiving a second request to reload the image.

The steps between step 210 and 216 may be repeated concurrently with the steps performed between step 200 and step 208. For example, while some images (e.g., newly received images) are being converted from the object notation format to the HTML format and rendered, it is possible to continue to convert images rendered in the HTML format into screenshots and then render the screenshots, and further to display other images that were previously cached as screenshots.

The concurrent repetition of the steps of FIG. 2 may be performed in the background with additional images that are available for display, but not yet displayed on the user device. Thus, for example, it may be possible to convert non-displayed images form object notation format to HTML format, and then cached, prior to displaying the non-displaying images. Then, when the additional images are to be displayed, the previously un-displayed cached images in the HTML format may be retrieved from the cache. In this manner, a large library of images may be displayed more quickly while a user is engaged in a session viewing other images.

In an embodiment, the method of FIG. 2 may terminate at step 216. However, the method may be further modified or extended.

For example, at step 218 the method may include generating a document using the digital image. For example, the rendered image may be automatically included in a template designed for use in a software program, such as a word processor, presentation creation program, or an email program. In a specific example, the document may be an email, and the digital image may be pasted in or attached to the email.

In another specific embodiment, a list of digital images that have been rendered at any of the three increments mentioned above may be displayed to a user. The user selects an image. The user selection of the image is then placed into the document as part of step 218.

In another example, the images may be obtained from third party websites. For example, screen scraping may be performed to retrieve images in one or more of the object notation data format, the HTML data format, or the image data file format. The screen scraping may be performed prior to receiving the first request to reload the digital image, or prior to receiving the second request to reload the digital image.

The screen scraping may be performed concurrently with other steps in the method of FIG. 2. Thus, for example, screen scraping may be performed at least concurrently with rendering the digital image using the HTML data format. Because the first increment, second increment, and third increment of the one or more embodiments may be performed concurrently, the screen scraping may be performed at various stages in the method of FIG. 2.

The retrieved images may be added to a list of images displayed to a user. The modified list of images then may be made available for user selection to add to a document at step 218.

Thus, in a specific example, screen scraping may generate additional images. The additional images are converted into sets of hypertext markup language (HTML) data. The sets of HTML data are cached to generate cached sets of HTML data. A second request to reload an additional digital image is received from the additional digital images. Then, responsive to receiving the second request to reload, the additional digital image are rendered using the HTML data format to generate a second rendered digital image.

Then, a second screenshot of the second rendered digital image is captured. The second screenshot is stored. A third request to reload the second digital image is received, after receiving the second digital image and after storing the second screenshot. The second screenshot of the second digital image is returned.

Other variations are possible. For example, FIG. 3 shows a variation of the method of FIG. 2.

Step 300 includes providing a set of digital images stored in an object notation data format. Step 300 may be performed in a manner similar to step 200 of FIG. 2.

Step 302 includes receiving a user selection of a digital image in the set of digital images. The user selection may be received from a user input device of a user device (e.g., a user computer). The digital image may be displayed on a user display device, and then selected by the user interacting with a program executing on the user device (e.g., a web browser, word processing program, email program, or some other application). The user selection may be received from the user device via a network interface.

Step 304 includes converting the digital image into hypertext markup language (HTML) data format. Step 304 may be performed as described with respect to step 202 of FIG. 2.

Step 306 includes caching the HTML data to generate cached HTML data. Step 306 may be performed as described with respect to step 204 of FIG. 2.

Step 308 includes receiving a first request to reload the digital image. Step 308 may be performed as described with respect to step 206 of FIG. 2.

Step 310 includes rendering, responsive to receiving the request to reload, the digital image using the cached HTML data format to generate a rendered digital image. Step 310 may be performed as described with respect to step 208 of FIG. 2.

In an embodiment, the method of FIG. 3 may terminate after step 310 (e.g., after the first increment and the second increment described with respect to FIG. 2 have been performed). However, the method of FIG. 3 may also continue.

Thus, step 312 may include capturing a screenshot of the rendered digital image. Step 312 may be performed as described with respect to step 210 of FIG. 2.

Step 314 may include storing the screenshot. Step 314 may be performed as described with respect to step 212 of FIG. 2.

Step 316 may include receiving a second request to reload the digital image, after receiving the first request to reload the digital image and after storing the screenshot. Step 316 may be performed as described with respect to step 214 of FIG. 2.

Step 318 may include returning the screenshot of the digital image. Step 318 may be performed as described with respect to step 216 of FIG. 2.

In an embodiment, the method of FIG. 3 may terminate after step 318 (e.g., after the third increment described with respect to FIG. 2 has been performed). However, the method of FIG. 3 may be further modified. For example, the method of FIG. 3 may be performed concurrently in the background (i. e., automatically and without displaying the process to a user) on other images that are yet to be displayed.

Thus, the method of FIG. 3 also may include converting, before receiving a request for a second digital image in the set of digital images, the second digital image into a second HTML data format. The second HTML data format is cached to generate second cached HTML data. A second request to reload the second digital image is received. Responsive to receiving the second request to reload, the second digital image is rendered using the second HTML data format to generate a second rendered digital image.

The above additional processing may be the first increment or the second increment occurring with respect to images other than those on display to a user. However, the above additional processing also may include the third increment.

Thus, the method also may include capturing a screenshot of the second rendered digital image and then storing the screenshot. Then, a third request to reload the second digital image is received, after receiving the first request to reload the second digital image and after storing the screenshot. The screenshot of the second digital image is returned. In this case, storing the screenshot includes storing the screenshot on a server computer. Returning the screenshot of the digital image may include transmitting the screenshot to a remote computer for display on the remote computer.

While the various steps in the flowcharts of FIG. 1A and FIG. 1B are presented and described sequentially, at least some of the steps may be executed in different orders, may be combined or omitted, and at least some of the steps may be executed in parallel. Furthermore, the steps may be performed actively or passively.

For example, in another variation, during each increment, a switching mechanism may be utilized to dynamically display the fasted returned data format when users are to view the images. Thus, for example, the three increments may be used at various different times to deliver customized on-brand templates to users in the fastest possible fashion. A further example is shown in FIG. 4A through FIG. 4G.

FIG. 4A, FIG. 4B, FIG. 4C, FIG. 4D, FIG. 4E, FIG. 4F, and FIG. 4G show an example of image generation from HTML data using incremental caching. The example of FIG. 4A through FIG. 4G may be implemented using the system shown in FIG. 1, and may be considered a variation of the methods shown in FIG. 2 and FIG. 3. The following example is for explanatory purposes only and not intended to limit the scope of the one or more embodiments.

Figure 4A:
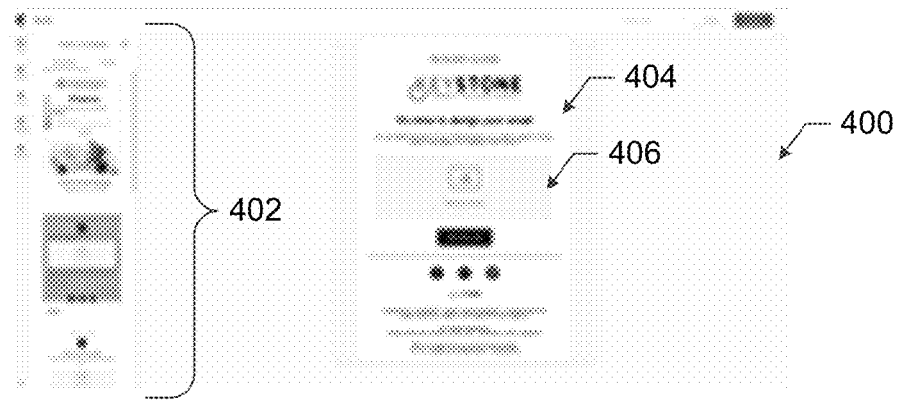

FIG. 4A shows a first graphical user interface (400) a set of templates (402). The digital images shown in the set of templates (402) may be thumbnail images, which are images that occupy less than a threshold amount of data. Thumbnail images may be quickly rendered and displayed. A user selects a selected template (404) in the set of templates (402). A larger version of the selected template (404) is displayed in a separate area of the screenshot.

In the example, the selected template (404) is a template for use in generating an interactive email that will contain a variety of different images. Thus, the selected template (404) includes a widget (406), displayed as a blank box. The widget prompts the user to select a picture for insertion into the selected template (404).

Figure 4B:

After the user selects the widget (406) in FIG. 4A, a library of images stored as JSON objects is accessed, as shown in FIG. 4B. Thus, FIG. 4B refers to the first increment in the incremental process described above. The images are rendered and, over a first amount of time, are displayed on a second graphical user interface (408). The images may be rendered sequentially or concurrently, and may be rendered in batches in some cases.

In the example, the first amount of time may be deemed slow by the user. However, it is anticipated that the user will browse through the images, browse through other images, and recall some or all of the images for consideration. Thus, it is anticipated that some or all of the images, such as image (410), will be reloaded and displayed on the user's display device.

Next, as shown by FIG. 4C, the second increment of the incremental caching process described herein is performed. In particular, the JSON data objects that define the images in FIG. 4B are converted into an HTML data format, as shown in HTML pseudocode snippet (412). The snippet shown in FIG. 4C is a portion of the code that may be used. Once the HTML data is generated, the HTML data is stored in a cache.

Thereafter, a request to reload the set of images is generated. In response, the cached HTML data is rendered, which generates a new set of images shown in the third graphical user interface (414) of FIG. 4D. Rendering the images using the HTML data uses a second amount of time. The second amount of time is less than the first amount of time that had been used to generate the images shown in the second graphical user interface (408) of FIG. 4A. Thus, the user experience may be improved.

Figure 4D:
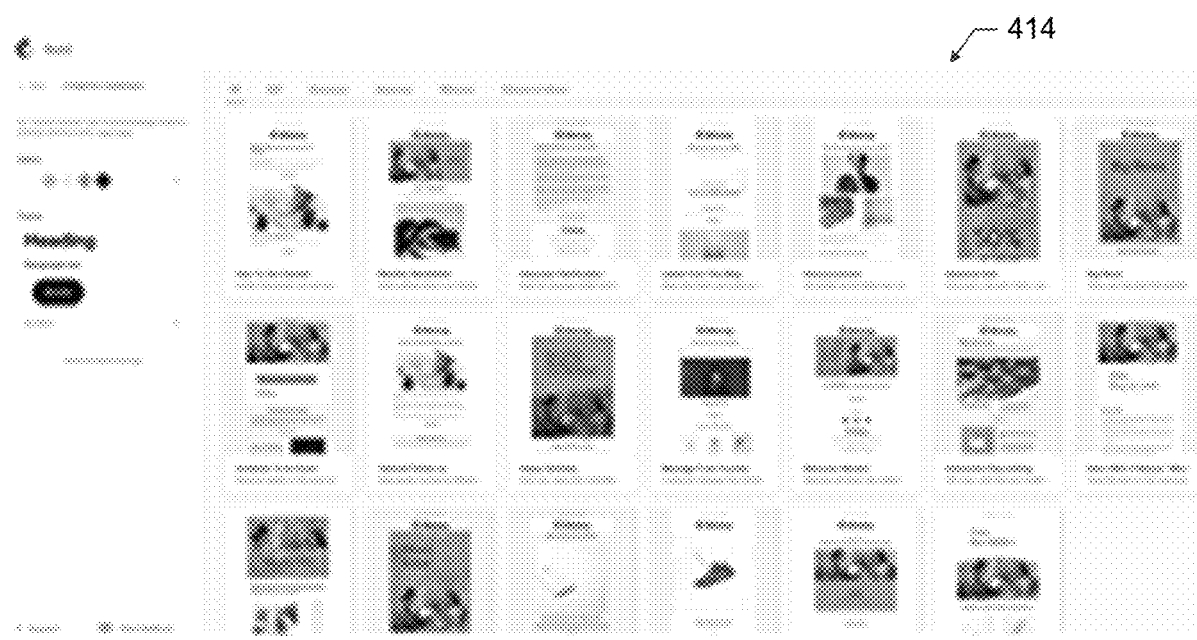
Figures 4F, 4G:
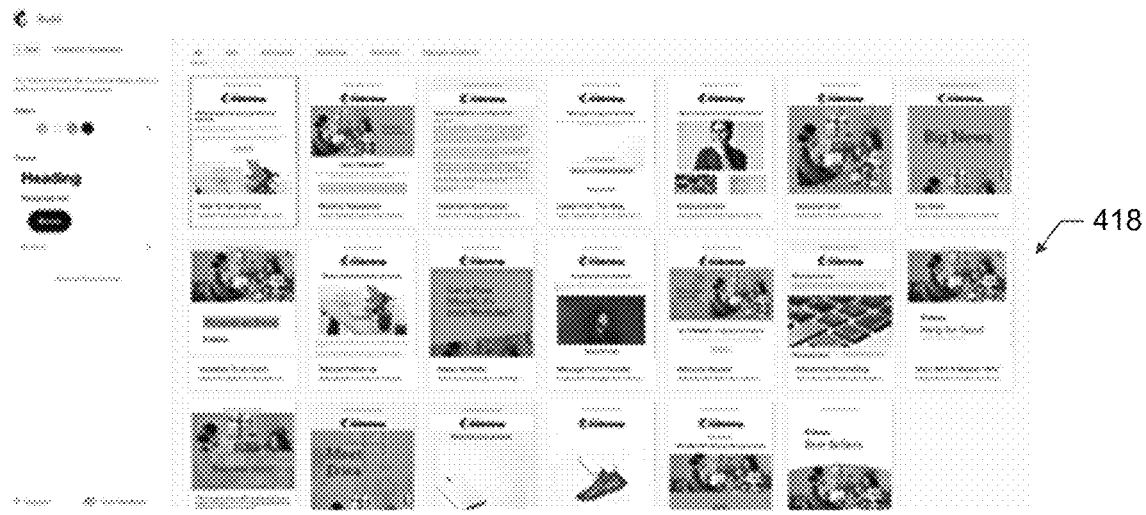

FIG. 4E shows a pseudocode snippet (416) useful for rendering images using HTML, data, as shown in FIG. 4D. The pseudocode snippet shown in FIG. 4E is a portion of the code that may be used for such rendering.

Optionally, a modified version of the HTML data may be cached. A portion of code that the HTML data may be stored in a pre-rendered state for rendering the images more quickly in response to subsequent request to reload the images. For example, some intermediate results generated as part of initially rendering the HTML data may be stored along with the HTML data. The resulting modified HTML data is then cached.

FIG. 4F and FIG. 4G show the third increment in the incremental caching process described herein. In particular, FIG. 4F shows a screenshot (418) of one or more of the images displayed in the third graphical user interface (414) shown in FIG. 4D. The screenshot (418) is captured by a command issued by an automatic process operating without a command from the user. The captured screenshot (418) is stored in an image data format, such as a ".png" or a ".jpeg" data format. The image data format may be cached.

FIG. 4G shows pseudocode snippet (420) for storing, calling, and displaying an image stored in a picture data file format. The pseudocode snippet (420) is a portion of the code that may be used for such rendering.

When a second, or subsequent, request to reload the images is received, the image file for the screenshot (418) in FIG. 4D may be retrieved. As a result, the image file may be displayed in a third amount of time, less than either the first amount of time or the second amount of time. To a user, the third amount of time may appear to be instant.

Embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 5A, the computing system (500) may include one or more computer processors (502), non-persistent storage (504), persistent storage (506), a communication interface (508) (e.g., Bluetooth interface, infrared interface, network interface, optical interface, etc.), and numerous other elements and functionalities that implement the features and elements of the disclosure. The computer processor(s) (502) may be an integrated circuit for processing instructions. The computer processor(s) may be one or more cores or micro-cores of a processor. The computer processor(s) (502) includes one or more processors. The one or more processors may include a central processing unit (CPU), a graphics processing unit (GPU), a tensor processing units (TPU), combinations thereof, etc.

The input devices (510) may include a touchscreen, keyboard, mouse, microphone, touchpad, electronic pen, or any other type of input device. The input devices (510) may receive inputs from a user that are responsive to data and messages presented by the output devices (512). The inputs may include text input, audio input, video input, etc., which may be processed and transmitted by the computing system (500) in accordance with the disclosure. The communication interface (508) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the output devices (512) may include a display device, a printer, external storage, or any other output device. One or more of the output devices may be the same or different from the input device(s). The input and output device(s) may be locally or remotely connected to the computer processor(s) (502). Many different types of computing systems exist, and the aforementioned input and output device(s) may take other forms. The output devices (512) may display data and messages that are transmitted and received by the computing system (500). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments, which may include transmitting, receiving, presenting, and displaying data and messages described in the other figures of the disclosure.

Figure 5B:
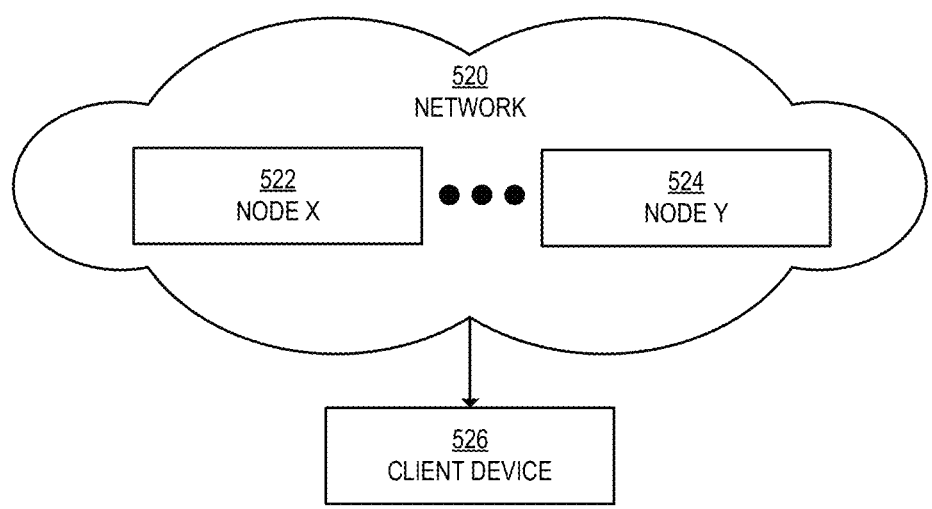

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (500) may be located at a remote location and connected to the other elements over a network.

The nodes (e.g., node X (522), node Y (524)) in the network (520) may be configured to provide services for a client device (526), including receiving requests and transmitting responses to the client device (526). For example, the nodes may be part of a cloud computing system. The client device (526) may be a computing system, such as the computing system shown in FIG. 5A. Further, the client device (526) may include and/or perform all or a portion of one or more embodiments.

The computing system of FIG. 5A may include functionality to present raw and/or processed data, such as results of comparisons and other processing. For example, presenting data may be accomplished through various presenting methods. Specifically, data may be presented by being displayed in a user interface, transmitted to a different computing system, and stored. The user interface may include a GUI that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be temporary, permanent, or semi-permanent communication channel between two entities.

The various descriptions of the figures may be combined and may include or be included within the features described in the other figures of the application. The various elements, systems, components, and steps shown in the figures may be omitted, repeated, combined, and/or altered as shown from the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, or is an "inclusive or" and, as such includes "and." Further, items joined by an or may include any combination of the items with any number of each item unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:
    receiving a digital image stored in an object notation data format;
    converting the digital image into hypertext markup language (HTML) data format;
    caching the HTML data format to generate cached HTML data;
    receiving a first request to reload the digital image, wherein receiving comprises receiving a user selection of the digital image;
    rendering, responsive to receiving the first request to reload, the digital image using the cached HTML data to generate a rendered digital image; and
    generating a document using the user selection of the digital image.

2. The method of claim 1, further comprising:
    capturing a screenshot of the rendered digital image;
    storing the screenshot;
    receiving a second request to reload the digital image, after rendering and after storing the screenshot; and
    returning the screenshot of the digital image.

3. The method of claim 1, wherein receiving comprises:
    screen scraping the digital image from a third party website.

4. The method of claim 1, wherein the screen scraping is performed prior to receiving the first request to reload the digital image.

5. The method of claim 1, further comprising:
    screen scraping, at least concurrently with rendering the digital image using the HTML data format, a plurality of additional digital images from a third party web site;
    converting the plurality of additional digital images into sets of hypertext markup language (HTML) data;
    caching the sets of HTML data to generate cached sets of HTML data;

receiving a second request to reload an additional digital image from the plurality of additional digital images; and rendering, responsive to receiving the second request to reload, the additional digital image using the HTML data format to generate a second rendered digital image.

6. The method of claim 5, further comprising:
capturing a second screenshot of the second rendered digital image;
storing the second screenshot;
receiving a third request to reload the second rendered digital image, after receiving the second rendered digital image and after storing the second screenshot; and
returning the second screenshot of the second rendered digital image.

7. The method of claim 2, wherein storing the screenshot comprises storing the screenshot as one of a portable network graphics (.png) file format and a joint photographic experts group (.jpeg) file format.

8. The method of claim 2, wherein storing the screenshot comprises storing the screenshot on a server computer, and wherein returning the screenshot of the digital image comprises transmitting the screenshot to a remote computer for display on the remote computer.

9. The method of claim 1, wherein the object notation data format comprises JavaScript Object Notation (JSON) open standard file and data interchange format.

10. A method comprising:
providing a plurality of digital images stored in an object notation data format;
receiving a user selection of a digital image in the plurality of digital images;
converting the digital image into hypertext markup language (HTML) data format;
caching the HTML data format to generate cached HTML data;
receiving a first request to reload the digital image;
rendering, responsive to receiving the first request to reload, the digital image using the cached HTML data to generate a rendered digital image; and generating a document using the user selection of the digital image.

11. The method of claim 10, further comprising:
capturing a screenshot of the rendered digital image;
storing the screenshot;
receiving a second request to reload the rendered digital image, after receiving the first request to reload the rendered digital image and after storing the screenshot; and
returning the screenshot of the rendered digital image.

12. The method of claim 10, further comprising:
converting, before receiving a request for a second digital image in the plurality of digital images, the second digital image into a second hypertext markup language (HTML) data format;
caching the second HTML data format to generate second cached HTML data;
receiving a second request to reload the second digital image; and
rendering, responsive to receiving the second request to reload, the second digital image using the second HTML data format to generate a second rendered digital image.

13. The method of claim 12, further comprising:
capturing a screenshot of the second rendered digital image;
storing the screenshot;
receiving a third request to reload the second digital image, after receiving the first request to reload the second digital image and after storing the screenshot; and
returning the screenshot of the second digital image.

14. The method of claim 11, wherein storing the screenshot comprises storing the screenshot on a server computer, and wherein returning the screenshot of the rendered digital image comprises transmitting the screenshot to a remote computer for display on the remote computer.

15. A system comprising:
a processor;
a network interface in communication with the processor;
a data repository in communication with the processor and storing:
a digital image,
an object notation data image that stores the digital image in an object notation data format,
a hypertext markup language (HTML) digital image that stores the digital image in an HTML data format,
cached HTML data;
a first request to reload the digital image, and
a rendered digital image; and
a server controller programmed, when executed by the processor, to:
receive the object notation data image, wherein receiving comprises receiving a user selection of the digital image,
convert the object notation data image into the HTML digital image,
cache the HTML digital image to generate the cached HTML data,
receive the first request to reload the digital image,
render, responsive to receiving the first request, the digital image using the cached HTML data to generate the rendered digital image, and
generate a document using the user selection of the digital image.

16. The system of claim 15, wherein the server controller is further programmed, when executed by the processor, to:
capture a screenshot of the rendered digital image;
store the screenshot;
receive a second request to reload the digital image, after rendering and after storing the screenshot; and
return the screenshot of the digital image.

17. The system of claim 15, wherein the server controller is further programmed, when executed by the processor to:
screen scrape, at least concurrently with rendering the digital image using the HTML data format, a plurality of additional digital images from a third party web site;
convert the plurality of additional digital images into sets of hypertext markup language (HTML) data; and
cache the sets of HTML data to generate cached sets of HTML data.

18. The system of claim 17, wherein the server controller is further programmed, when executed by the processor to:
receive a second request to reload an additional digital image from the plurality of additional digital images; and
render, responsive to receiving the second request to reload, the additional digital image using the HTML data format to generate a second rendered digital image.

* * * * *